United States Patent
Lyngberg et al.

(10) Patent No.: US 8,714,878 B2
(45) Date of Patent: May 6, 2014

(54) PIPE LAYING APPARATUS AND METHOD

(75) Inventors: Kim Lyngberg, Invervurie (GB); Jenny McEwans, Invervurie (GB)

(73) Assignee: Saipem UK Limited, Surrey (GB)

( * ) Notice: Subject to any disclaimer, the term of this patent is extended or adjusted under 35 U.S.C. 154(b) by 394 days.

(21) Appl. No.: 12/746,856

(22) PCT Filed: Nov. 10, 2008

(86) PCT No.: PCT/GB2008/003779
§ 371 (c)(1),
(2), (4) Date: Jun. 3, 2011

(87) PCT Pub. No.: WO2009/077711
PCT Pub. Date: Jun. 25, 2009

(65) Prior Publication Data
US 2012/0020739 A1    Jan. 26, 2012

(30) Foreign Application Priority Data
Dec. 14, 2007 (GB) .................... 0724476.7

(51) Int. Cl.
*F16L 1/12* (2006.01)

(52) U.S. Cl.
USPC ....................... 405/168.3; 405/166

(58) Field of Classification Search
USPC ............... 405/154.1, 158, 166, 168.3, 168.4, 405/168.1; 114/244, 258, 259, 264, 265
See application file for complete search history.

(56) References Cited

U.S. PATENT DOCUMENTS

| | | | |
|---|---|---|---|
| 3,670,988 A * | 6/1972 | Leonard | 242/397.2 |
| 3,782,319 A * | 1/1974 | Hale | 114/244 |
| 4,687,376 A | 8/1987 | Recalde | |
| 4,695,010 A * | 9/1987 | Smith | 242/478.2 |
| 5,527,134 A | 6/1996 | Recalde | |
| 6,286,780 B1 * | 9/2001 | Yuyama et al. | 242/563 |
| 6,328,502 B1 * | 12/2001 | Hickey et al. | 405/168.3 |
| 6,710,319 B2 * | 3/2004 | Ohtomo et al. | 250/206.1 |

OTHER PUBLICATIONS

International Search Report for PCT/GB2008/003779 completed Apr. 29, 2009.
Written Opinion for PCT/GB2008/003779 completed Apr. 29, 2009.

* cited by examiner

*Primary Examiner* — Sean Andrish
(74) *Attorney, Agent, or Firm* — Buchanan Ingersoll Rooney PC

(57) ABSTRACT

Apparatus for laying conduit from a vessel comprises reel carrier arranged to receive a reel (202) wound with conduit (204) and capable of being reciprocated along the direction of the axis (214) of the reel as the conduit is unwound. The apparatus further comprises a straightener (208), and a control unit arranged to control the reel carrier such that the fleet angle created between the conduit and the straightener is reduced. Such an arrangement ensures that the conduit is not bent past its limit of elastic deformability while allowing the straightener to be situated relatively close to the reel.

20 Claims, 4 Drawing Sheets

PIPE LAYING APPARATUS AND METHOD

TECHNICAL FIELD

The invention relates to, but not exclusively to, an apparatus and method for laying pipe from a pipe laying vessel.

BACKGROUND OF THE INVENTION

Subsea pipes or cables are often laid from pipe or cable laying vessels, where the pipes or cables are stored wound around a large reel before they are laid. FIG. 1 shows an example of a prior art arrangement, where a reel 100 of rigid pipe 102 is mounted on a reel carrier 104. In an alternative prior art arrangement, the reel 100 may be a reel of cable. The pipe 102 is unwound from the reel 100 and passed through a straightener 106 and a tensioner 108 before it moves down a stinger 110 and is laid on the sea bed. The pipe 102 being laid, being a rigid pipe stored on a reel, needs to be straightened and undergo plastic deformation, by means of the straightener 106. Thus, as the pipe 102 is unwound from the reel 100 the straightener 106 bends about a horizontal axis the pipe 102 in order to straighten the pipe 102 from being curved from being wound up around the reel 100. In order that the pipe 102 is not bent about its vertical axis past its limit of elastic deformability, the fleet angle between the pipe 102 and the straightener 106 must be kept below a certain angle. FIG. 2 shows a plan view of the pipe laying arrangement of FIG. 1, where the fleet angle is the angle θ created between the pipe and the straightener due to the offset between the part of the reel 100 from which the pipe 102 is being unwound and the position of the straightener 106. As can be seen, the fleet angle will be greatest when the pipe 102 is being unwound from the edges of the reel 100. When the pipe 102 is directly in line with the straightener 106 the fleet angle is 0 degrees. The fleet angle is always to be considered as a positive angle, as a measure of the deviation away from the 0 degrees when the pipe 102 is directly in line with the straightener 106, regardless of which side of the straightener 106 the pipe 102 has been deviated.

FIG. 2 shows a simplified version of how the pipe 102 travels from the reel 100 to the straightener 106. In most cases, the pipe 102 will actually be controlled so as to form an S-curve in the horizontal plane, with the curvature being kept within the limits of the elastic bending range. This adds further complexity to the pipe laying arrangement. Despite the fact that the pipe 102 may not form a straight line between where it leaves the reel 100 and where it passes through the straightener 106, the fleet angle can still be used as a measure of the offset between where the pipe 102 leaves the reel 100 and meets the straightener 106.

A further disadvantage of having a large fleet angle is that when a pipe or cable is being laid in an arrangement as described above, the large fleet angle may lead to the pipe or cable wearing or becoming damaged where it meets the straightener, leading to failure or reduced working life of the pipe or cable.

In order to keep the fleet angle below a certain maximum angle the reel 100 must be sited a relatively large distance from the straightener 106. In order to reduce this distance slightly, the straightener may be in a "floating" type arrangement, where it is possible for it to move from side to side as necessary and thereby help manage the fleet angle. However, the distance between the straightener 106 and the reel 100 is still large and the straightener arrangement may be complicated.

Also, the straightener must feed the pipe 102 to the tensioner 108 approximately straight on, with no significant fleet angle. Therefore, if the straightener 106 is located closer to the reel 100 due to being in a "floating" arrangement as described, the tensioner 108 must be located further away from the straightener 106 to reduce the change in angle of the pipe it receives due to the movement of the straightener.

The present invention seeks to at least partially mitigate or overcome these disadvantages.

SUMMARY OF THE INVENTION

The present invention provides apparatus for laying conduit from a vessel comprising a reel carrier arranged to receive a reel wound with conduit and capable of being reciprocated along the direction of the axis of the reel, a straightener, and a control unit arranged to control the reel carrier during the laying process such that the fleet angle created between the conduit and the straightener is reduced.

The axis of the reel is the axis around which the conduit is wound. Advantageously, the reel carrier may be reciprocated as the conduit is unwound such that the part of the reel from which the conduit is being unwound is substantially in direct alignment with the straightener, thereby reducing or eliminating any fleet angle between the conduit and the straightener. Advantageously, the straightener can be located much closer to the reel and reel carrier, thereby saving space on a pipe laying vessel. The straightener may be located within 5 meters of the reel and reel carrier. More preferably, the straightener may be located within 3 meters of the reel and reel carrier. Advantageously, the closer the straightener is located to the reel and reel carrier, the easier the pipe is to control. Further advantageously, a reel of greater than standard width may be used without the fleet angle becoming excessive.

The apparatus may be installed on a pipe laying vessel. Alternatively, the apparatus may be installed on a multipurpose support vessel (MSV) in order to adapt the MSV into a pipe laying vessel.

The reel carrier may be mounted on rails. The rails may be mounted traverse to the direction of conduit lay. The reel carrier may include wheels, rollers, low friction pads or air skates to enable the reciprocating motion.

A hydraulic drive unit may be arranged to reciprocate the reel carrier under the control of the control unit. Alternatively, the drive unit may be pneumatic or electrically driven, or alternatively the reel carrier may be driven by any other suitable means. The reel carrier and the drive unit may be capable of handling large loads. The weight of the reel including the weight of the pipe or cable may be 400 tonnes or more. The weight of the reel excluding the weight of the pipe or cable may be 50 tonnes or more.

The control unit may control the reel carrier manually or automatically. The control unit may include a central processing unit (CPU) arranged to control the reel carrier in accordance with an automatic pre-programmed algorithm. The pre-programmed algorithm may take into account how the pipe is wound on the reel and how the circumference of the reel reduces as the pipe is unwound. The control unit may be adjustable to take into account different types of conduit and/or reels being used. The control unit may be an entirely mechanical arrangement. Alternatively, the control unit may comprise an input, the input may be controlled by a person operating the apparatus or proximity switches.

The apparatus may further include a reel wound with conduit mounted upon the reel carrier. The conduit may be a pipe for conveying fluids, such as oil, or may be a tube or duct for enclosing electrical or fibre optic wires or cables. The conduit may be an umbilical for controlling subsea installations. The conduit wound around a reel may be a single continuous length of pipe or may be a pipe created out of a plurality of sections of pipe welded (or joined in any other suitable manner) together. The pipe may be a rigid pipe. The pipe may be an insulated pipe. The pipe may be suitable for carrying oil, gas, carbon hydrate or water (fresh, seawater or produces water) in a subsea environment. A typical pipe diameter may be from 3 inches (76 mm) to 8 inches (203 mm). Alternatively, a pipe diameter may be from 2 inches (56 mm) to 18 inches (457 mm) or more. The payout speed from the reel may be from 0 to 500 meters per hour. The payout speed may be greater than 500 meters per hour.

A fleet angle monitor may be arranged to measure the fleet angle between the conduit and the straightener. The fleet angle monitor may be associated with the control unit. The control unit may be a CPU arranged to control the reel carrier in accordance with the measured fleet angle. The fleet angle monitor may be arranged such that when it detects that the conduit is moving such that an undesirable fleet angle has been or will be created between the conduit and the straightener the control unit actuates the reel carrier in the appropriate direction in order to reduce the fleet angle. The fleet angle monitor may include a proximity switch. The fleet angle monitor may include a laser guide. Preferably, the reel carrier is arranged to receive the reel with the reel axis in the approximately horizontal plane.

The straightener may be movable in the vertical plane. The straightener may be pivotable. The straightener may be pivotable in a horizontal or vertical plane. The straightener may be restricted such that it cannot move from side to side in a horizontal plane. Advantageously, the straightener can compensate for the change of angle caused as the conduit moves from being unwound from the outer part of the reel to being unwound from the inner part of the reel. The straightener may compensate for a change of angle by moving in a vertical plane and/or pivoting in a horizontal plane. The straightener may be moved by a drive unit or it may be in a floating arrangement and reactive to and driven by the angle at which the conduit is presented to the straightener.

The invention further provides a method of laying conduit from a reel on a vessel comprising the steps of feeding the conduit from the reel through a straightener, and reciprocating the reel in a direction along the axis of the reel such that as the conduit is laid the fleet angle between the conduit and the straightener is reduced.

Advantageously, reciprocating the reel as the conduit is unwound enables the fleet angle to be kept low or zero, so that the part of the conduit being unwound from the reel is always approximately in line with the straightener. Preferably, the fleet angle between the conduit and the straightener is kept between the range from 0 to 5 degrees, more preferably between 0 to 3 degrees and even more preferably between 0 and 1 degrees. Preferably, when viewed from above, the conduit appears to be approximately straight as it passes through the straightener.

The reciprocation of the reel may be controlled by a control unit. The control unit may reciprocate the reel manually or automatically. The control unit may reciprocate the reel in accordance with an automatic pre-programmed algorithm. The control unit may be a central processing unit. The control unit may reciprocate the reel in accordance with the measured fleet angle between the pipe or cable and the straightener. The control unit may include proximity switches. The control unit may be an entirely mechanical arrangement. Alternatively, the control unit may comprise an input, the input may be controlled by a person operating the apparatus.

The conduit being laid may be rigid pipe. A rigid pipe is typically used when laying subsea pipes and the skilled man will appreciate that such a rigid pipe is not entirely inflexible. The rigid pipe may be plastically deformable to a limited extent. The rigid pipe may be plastically deformable to the extent that it may be wound in a reel. The rigid pipe may be elastically deformable to a limited extent.

The reel may be mounted on the vessel with its axis in a substantially horizontal plane. The method may include the step of the straightener being vertically adjusted as the pipe or cable is unwound from the reel as the pipe or cable is laid. Advantageously, this compensates for the change of angle of the pipe as it is unwound from the outer part of the reel to the inner part of the reel. The pipe or cable may be being laid in an S-lay or a J-lay configuration.

The apparatus may be capable of being installed on a vessel. The vessel may be a multi-purpose support vessel. The invention also provides a conduit laying vessel including the apparatus as described above. The vessel may be a pipe or cable laying vessel. The invention also provides a vessel suitable for performing a method of conduit laying as described above.

The invention also provides a reel carrier for carrying a reel wound with conduit, wherein the reel carrier may be reciprocated along direction of the axis of the reel. The reel carrier may be installed on a vessel, including a multi-purpose support vessel.

Where features of the invention have been described above in relation to one aspect of the invention, they are equally applicable to other aspects of the invention and vice versa.

BRIEF DESCRIPTION OF THE DRAWINGS

Embodiments of the invention will now be described with reference to the following figures, of which.

DETAILED DESCRIPTION

Figure 1:
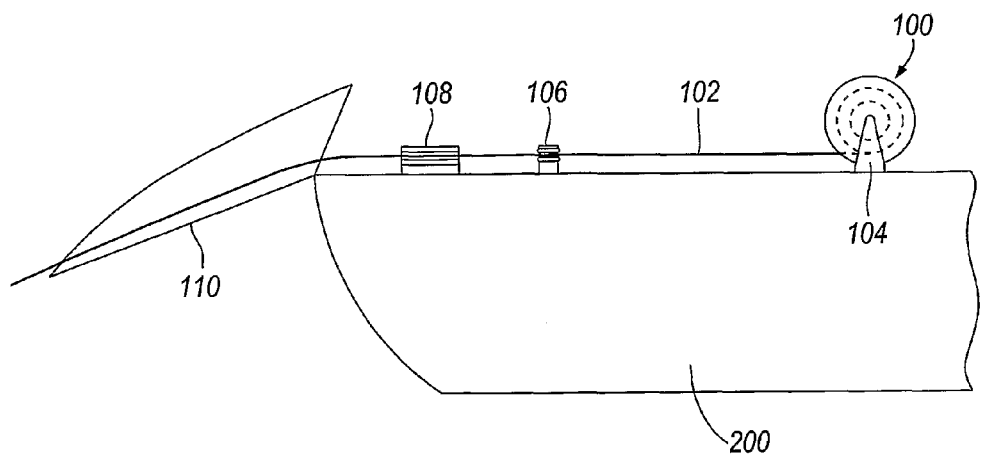
FIG. 1 shows a pipe-laying apparatus according to the prior art.
Figure 2:
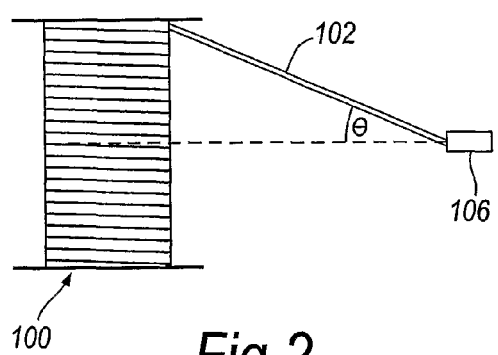
FIG. 2 shows a plan view of the pipe-laying apparatus of FIG. 1, with particular reference to the fleet angle.
Figure 3:
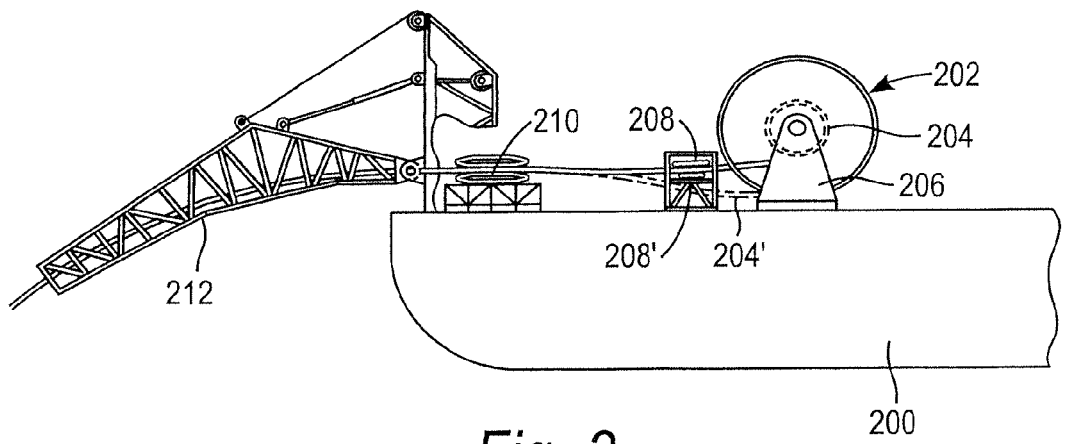
FIG. 3 shows a side view of an embodiment of the invention.

FIG. 3 shows a pipe laying vessel 200 including a reel 202 on which a plastically deformable pipe 204 is wound. The reel 202 is mounted on a reel carrier 206 with the axis of the reel in an approximately horizontal plane and perpendicular to the direction of lay of the pipe. The pipe 204 is unwound and fed through a straightener 208, a tensioner 210 and then down a stinger 212 as it is laid on the seabed. The straightener 208 bends the pipe 204 from the curved state which is caused by being wound around the reel 202 into a state where it is approximately straight and ready to be laid.

Figure 4:
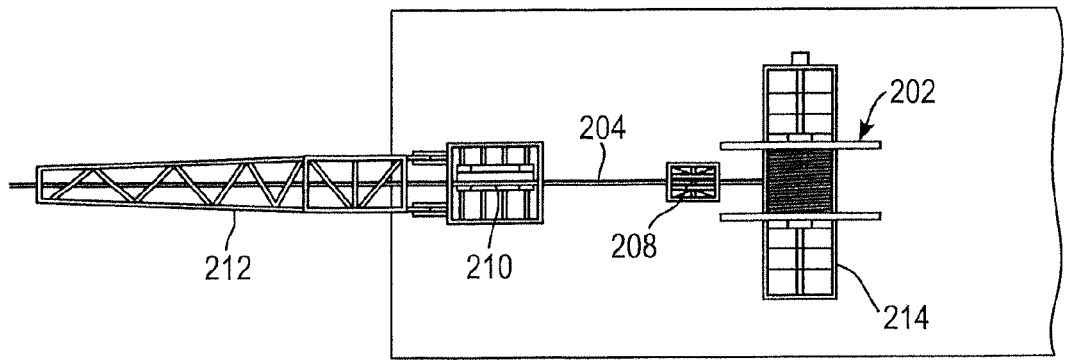
FIG. 4 shows a plan view of the embodiment of the invention.
Figure 7:
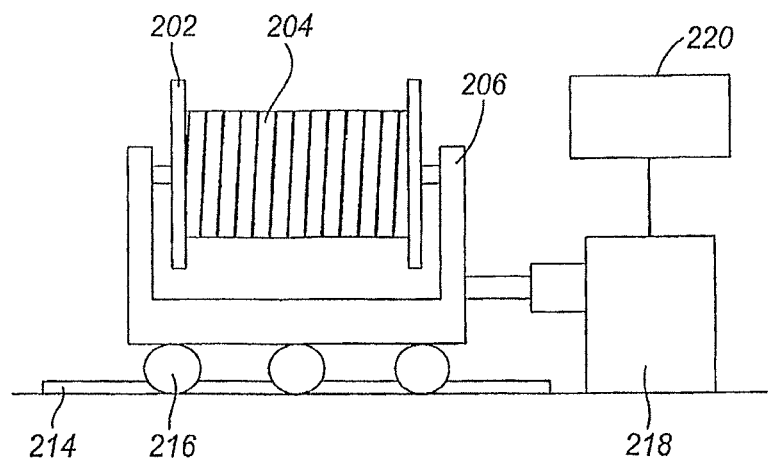
FIG. 7 shows the rear view of the embodiment.

FIG. 4 shows a plan view of the apparatus shown in FIG. 3. The reel carrier 206 is mounted on a set of rails 214, the rails 214 running traverse to the deck of the vessel 200, such that the reel carrier 206 may be reciprocated between the port and starboard sides of the vessel 200. In this case, as shown in FIG. 7, the reel carrier 206 runs on a set of wheels 216 mounted on the rails 214, though rollers or low friction pads could be used.

The reciprocation of the reel carrier 206 between the port and starboard sides of the vessel 200 is driven by a hydraulic drive unit 218. The hydraulic drive unit is controlled by a control unit 220, where the control unit 220 is arranged to reciprocate the reel carrier 206 such that the fleet angle created between the pipe 204 and the straightener 208 remains at approximately 0 degrees as the pipe 204 is laid. The position of the reel carrier 206 on the rails 214 depends on the part of the reel 202 that the pipe 204 is being unwound from at any particular time.

Figure 5:
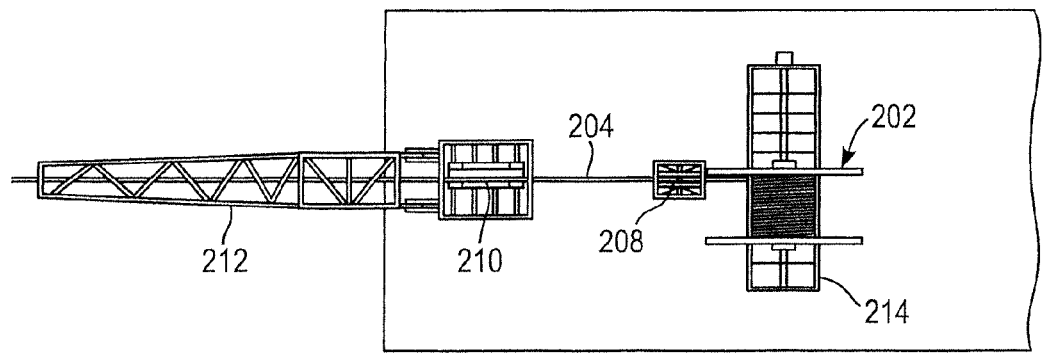
FIG. 5 shows the embodiment of FIG. 4 with the reel in the furthermost port position.
Figure 6:
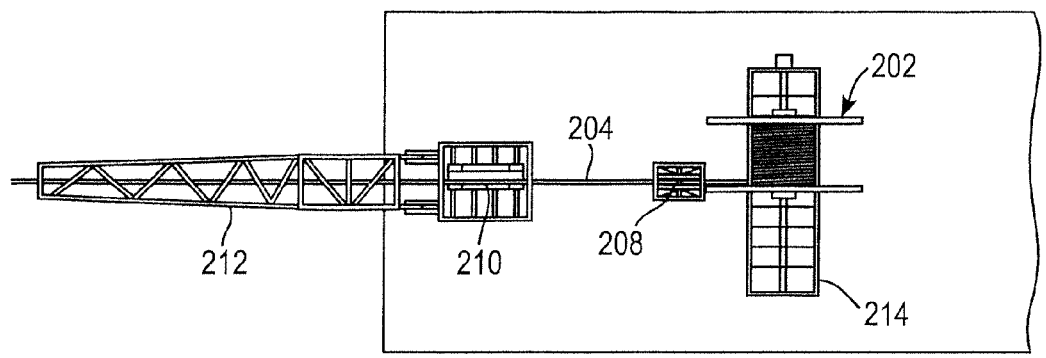
FIG. 6 shows the embodiment of FIG. 4 with the reel in the furthermost starboard position.

As can be seen from FIG. 5, when the pipe 204 is being unwound from the starboard side of the reel 202, the reel carrier is moved to the port side of the rails 214. Similarly, it can be seen from FIG. 6 that when the pipe is being unwound from the port side of the reel 202, the reel carrier 206 is moved to the starboard side of the rails 214. It can be seen from these figures that by reciprocating the reel carrier 206 in this way, the fleet angle remains constantly approximately zero.

Figure 8:
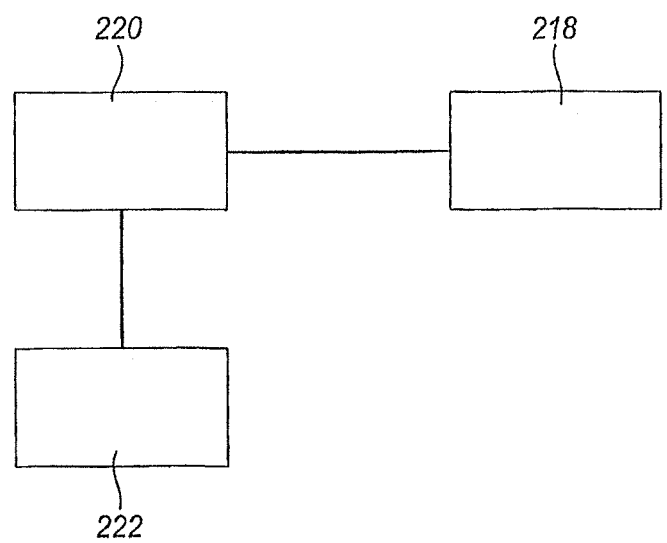
FIG. 8 shows a diagram of the control unit and measuring device in relation to the reel carrier.

FIG. 8 shows the control unit 220 associated with a fleet angle measuring unit 222. The fleet angle measuring unit 222 includes a pair of proximity switches which monitor whether the fleet angle is deviating from zero degrees as the reel 202 unwinds. If the fleet angle does deviate from zero degrees then the control unit 220 activates the hydraulic drive unit 218 to move the reel carrier 206 as appropriate.

It can also be seen that the distance between the straightener 208 and the reel 202 is considerably reduced in comparison to the distance in the prior art arrangement. The distances in the prior art arrangement may range between 15 m and 40 m. In the current embodiment, the distance between the straightener may be 5 m or less. As a result of the straightener 208 being close to the reel 204, it will be appreciated that as the reel 202 unwinds, the vertical angle at which the pipe 204 is presented to the straightener 208 varies. The pipe 204 shows the reel 202 towards the end of the laying process, when most of the pipe has been unwound and the pipe is close to the centre of the reel 202. The pipe 204' shows the vertical angle of the pipe when the reel 202 is initially unwound at the beginning of the laying process. The straightener can move to adapt to the varying vertical angle, as can be seen, the straightener initially being in the position indicated by 208'. In this case the straightener 208 is in a floating arrangement, such that tension in the pipe 204 moves the straightener 208 up or down as appropriate. The straightener 208 is also pivotable about a horizontal axis to enable it to adapt to the vertical angle of the pipe 204. In an alternative arrangement to the straightener being in a floating arrangement, the straightener may be driven by hydraulic or other means.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The invention may be used to lay cables rather than pipes, particularly cables that require straightening before being laid once they are unwound from a reel. The control unit may control the reciprocation of the reel carrier automatically, with no input from a measuring device. The control unit may control the reciprocation of the reel carrier manually. For example, the control unit may be an entirely mechanical unit, or include an input, such as a switch or lever which is operable by an operator.

The invention has been described in relation to an S-lay arrangement, with the pipe being unwound from the bottom of a reel. Alternatively, the pipe may be unwound from the top of a reel. Further alternatively, the invention may be applied to a J-lay arrangement. The J-lay arrangement may include the pipe being routed through an underbender and up into a J-lay tower. The J-lay arrangement may be a conventional arrangement with the pipe being unwound from the top of a reel.

It is to be understood that optional integers or features, whilst of possible benefit in some embodiments of the invention, may not be desirable, and may therefore be absent, in other embodiments. Any ranges of parameters, variables, or other values quoted herein are intended to cover the limits of the ranges inclusively.

The invention claimed is:

1. An apparatus for laying conduit from a vessel, the apparatus comprising:
   a reel carrier arranged to receive a reel wound with the conduit, the reel having an axis extending in a direction, and the reel carrier capable of being reciprocated along the direction of the axis of the reel,
   a straightener arranged downstream of the reel carrier, the straightener provided in a floating arrangement so that the straightener is capable of adapting to vertical changes caused by the amount of conduit remaining on the reel,
   a control unit arranged to control the reel carrier during the process of laying the conduit, and
   a fleet angle monitor arranged to measure a fleet angle between the conduit and the straightener,
   wherein the fleet angle monitor is associated with the control unit, and the control unit is arranged to control the reel carrier in accordance with the measured fleet angle such that the fleet angle created between the conduit and the straightener is reduced.

2. The apparatus as claimed in claim 1, wherein the reel carrier is mounted on rails.

3. The apparatus as claimed in claim 1, further comprising a hydraulic drive unit arranged to reciprocate the reel carrier under the control of the control unit.

4. The apparatus as claimed in claim 1, further comprising an electrical drive unit arranged to reciprocate the reel carrier under the control of the control unit.

5. The apparatus as claimed in claim 1, wherein the control unit is arranged to control the reel carrier automatically in accordance with a pre-programmed algorithm.

6. The apparatus as claimed in claim 1, wherein the straightener is movable in a vertical plane.

7. The apparatus as claimed in claim 1, wherein the straightener is pivotable about a horizontal axis.

8. The apparatus as claimed in claim 1, wherein the reel wound with the conduit is mounted on the reel carrier.

9. The apparatus as claimed in claim 8, wherein the conduit comprises rigid pipe.

10. A vessel including the apparatus as claimed in claim 1.

11. An apparatus for laying conduit from a vessel, the apparatus comprising:
    a reel carrier arranged to receive a reel wound with the conduit, the reel having an axis extending in a direction, and the reel carrier capable of being reciprocated along the direction of the axis of the reel,
    a straightener,
    a control unit arranged to control the reel carrier during the laying process, and
    a fleet angle monitor arranged to measure a fleet angle between the conduit and the straightener, wherein the fleet angle monitor is associated with the control unit, and the control unit is arranged to control the reel carrier in accordance with the measured fleet angle such that the fleet angle created between the conduit and the straightener is reduced, wherein the fleet angle monitor includes a proximity switch.

12. An apparatus for laying conduit from a vessel, the apparatus comprising:

a reel carrier arranged to receive a reel wound with the conduit, the reel having an axis extending in a direction, and the reel carrier capable of being reciprocated along the direction of the axis of the reel, a straightener, a control unit arranged to control the reel carrier during the process of laying the conduit, and a fleet angle monitor arranged to measure a fleet angle between the conduit and the straightener, wherein the fleet angle monitor is associated with the control unit, and the control unit is arranged to control the reel carrier in accordance with the measured fleet angle such that the fleet angle created between the conduit and the straightener is reduced, wherein the fleet angle monitor includes a laser guide.

13. A method of laying conduit from a reel on a vessel, the reel having an axis extending in a direction, the method comprising:

feeding the conduit from the reel through a straightener, providing the straightener in a floating arrangement so that the straightener is capable of adapting to vertical changes caused by the amount of conduit remaining on the reel;

measuring a fleet angle between the conduit and the straightener as the conduit is laid, and reciprocating the reel along the axis of the reel, wherein the reel is reciprocated in accordance with the measured fleet angle between the conduit and the straightener such that as the conduit is laid the fleet angle between the conduit and the straightener is reduced.

14. The method as claimed in claim 13, wherein the fleet angle between the conduit and the straightener is kept within the range from 0 to 5 degrees.

15. The method as claimed in claim 13, wherein the fleet angle between the conduit and the straightener is kept within the range from 0 to 3 degrees.

16. The method as claimed in claim 13, wherein the reciprocation of the reel is controlled by a control unit.

17. The method as claimed in claim 16, wherein the control unit reciprocates the reel in accordance with a preprogrammed algorithm.

18. The method as claimed in claim 13, wherein the conduit comprises rigid pipe.

19. The method as claimed in claim 13, wherein the straightener is vertically adjusted as the pipe or cable is unwound from the reel as the conduit is laid.

20. A vessel for laying conduit according to the method as claimed in claim 13.

* * * * *